US010430661B2

(12) United States Patent
Hu et al.

(10) Patent No.: US 10,430,661 B2
(45) Date of Patent: Oct. 1, 2019

(54) GENERATING A COMPACT VIDEO FEATURE REPRESENTATION IN A DIGITAL MEDIUM ENVIRONMENT

(71) Applicant: Adobe Inc., San Jose, CA (US)

(72) Inventors: Hao Hu, Orlando, FL (US); Zhaowen Wang, San Jose, CA (US); Joon-Young Lee, Milpitas, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 205 days.

(21) Appl. No.: 15/384,831

(22) Filed: Dec. 20, 2016

(65) Prior Publication Data

US 2018/0173958 A1 Jun. 21, 2018

(51) Int. Cl.
*G06K 9/00* (2006.01)
*G06K 9/46* (2006.01)
*G06K 9/62* (2006.01)
*G06N 3/04* (2006.01)

(52) U.S. Cl.
CPC ....... *G06K 9/00744* (2013.01); *G06K 9/4628* (2013.01); *G06K 9/6271* (2013.01); *G06N 3/0445* (2013.01); *G06N 3/0454* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2009/0175538 A1* | 7/2009 | Bronstein | G06K 9/00758 382/173 |
| 2010/0104184 A1 | 4/2010 | Bronstein et al. | |
| 2010/0257130 A1* | 10/2010 | Smallridge | G06N 3/02 706/25 |

(Continued)

FOREIGN PATENT DOCUMENTS

EP   3287946   2/2018

OTHER PUBLICATIONS

Singh, Bharat, et al. "A multi-stream bi-directional recurrent neural network for fine-grained action detection." Proceedings of the IEEE Conference on Computer Vision and Pattern Recognition. 2016. 11 pages (Year: 2016).*

(Continued)

*Primary Examiner* — Ryan P Potts
(74) *Attorney, Agent, or Firm* — SBMC (57) ABSTRACT

Techniques and systems are described to generate a compact video feature representation for sequences of frames in a video. In one example, values of features are extracted from each frame of a plurality of frames of a video using machine learning, e.g., through use of a convolutional neural network. A video feature representation is generated of temporal order dynamics of the video, e.g., through use of a recurrent neural network. For example, a maximum value is maintained of each feature of the plurality of features that has been reached for the plurality of frames in the video. A timestamp is also maintained as indicative of when the maximum value is reached for each feature of the plurality of features. The video feature representation is then output as a basis to determine similarity of the video with at least one other video based on the video feature representation.

19 Claims, 6 Drawing Sheets

(56) References Cited

U.S. PATENT DOCUMENTS

| | | | |
|---|---|---|---|
| 2010/0312730 A1* | 12/2010 | Weng | G06N 3/02 |
| | | | 706/15 |
| 2012/0321181 A1 | 12/2012 | Yang et al. | |
| 2016/0110609 A1 | 4/2016 | Lefebvre et al. | |
| 2017/0083798 A1* | 3/2017 | Yu | G06K 9/00751 |
| 2017/0127016 A1* | 5/2017 | Yu | G06K 9/00711 |
| 2017/0150235 A1* | 5/2017 | Mei | H04N 21/8405 |
| 2017/0206405 A1* | 7/2017 | Molchanov | G06K 9/00355 |
| 2017/0220854 A1* | 8/2017 | Yang | G06K 9/00335 |
| 2017/0262995 A1* | 9/2017 | Li | G06N 3/0445 |
| 2018/0018970 A1* | 1/2018 | Heyl | G10L 17/18 |
| 2018/0032846 A1* | 2/2018 | Yang | G06K 9/00711 |
| 2018/0041765 A1* | 2/2018 | Hua | G06K 9/00751 |
| 2018/0053057 A1* | 2/2018 | De Souza | G06K 9/00718 |

OTHER PUBLICATIONS

"Combined Search and Examination Report", Application No. 1717177.8, dated Apr. 18, 2018, 8 pages.

\* cited by examiner

GENERATING A COMPACT VIDEO FEATURE REPRESENTATION IN A DIGITAL MEDIUM ENVIRONMENT

BACKGROUND

Machine learning is used by service provider systems to support a variety of video functionality (e.g., video retrieval, video searching, video recommendations, and so forth) based on a determination of similarity of videos, one to another. A user, for example, may be presented with a list of recommended videos by a service provider system based on videos that were previously viewed by the user. In order to determine this similarity, the service provider system uses machine learning to generate representations of the videos that are comparable, one to another. Consequently, accuracy of the representations in describing respective videos also drives accuracy of the video comparison and resulting recommendations in this example.

Conventional machine learning techniques that are used to generate representations of videos, however, are designed for individual digital images and not videos. For example, conventional machine learning techniques generate a representation of each frame of the video, individually, which are then aggregated to form a representation of the video as a whole. As a result, conventional representations describe content included in individual frames but not a relationship of these frames to each other, e.g., changes to the video that occur in the frames over time. Consequently, convention representations are rather limited to what is described in individual frames.

Further, conventional machine learning techniques result in representations having lengths that are variable based on a number of frames in the video. This is because conventional techniques, as described above, rely on descriptions of content included in each of the individual frames. Thus, videos having increasingly greater numbers of frames also have additional greater representation lengths to describe these videos. This results in increased computational resource usage to generate these representations. Additionally, differences in the length of the representations also introduces complexities in a determination of similarity of the representations to each other by the service provider system and thus also increases computational resource usage.

Additionally, conventional techniques typically encode redundant information between frames of a video due to individual representation of each frame in the video using digital image techniques. For example, consecutive frames of the video may have similar content and thus result in similar redundant representations of that content in conventional representations. This redundant information is of little use in distinguishing one video from another and thus also increases computational resource usage by the service provider system due to comparisons that are forced to address this redundant information. Thus, these limitations in conventional representations of video generated by service provider systems limits an ability of these systems to accurately support functionality that is dependent on these representations, such as video retrieval, video searching, video recommendations, among others.

SUMMARY

Techniques and systems are described to generate a compact video feature representation for sequences of frames in a video. The video feature representation, for instance, may represent temporal order dynamics exhibited by the video and have a fixed length. Temporal order dynamics describe how values of features change over time, e.g., in a sequence of frames of a video. As a result, the video feature representation provides insightful information that may be used to characterize diverse types of video in a manner that support efficient comparison as a result of the fixed length. For example, a length of the video feature representation is independent of a number of frames in the video.

In one example, values of features are extracted from each frame of a plurality of frames of a video using machine learning, e.g., through use of a convolutional neural network. A video feature representation is then generated of temporal order dynamics of the video based on these extracted features, e.g., through use of a recurrent neural network. Thus, the video feature representation is based on a number of features and not a number of frames and thus has a length that is independent of a number of frames in a video. For example, a maximum value is maintained as part of the video feature representation of each feature of the plurality of features that has been reached for the plurality of frames in the video. A timestamp is also maintained as part of the video feature representation as indicative of when the maximum value is reached for each feature of the plurality of features. The video feature representation is then output as a basis to determine similarity of the video with at least one other video based on the video feature representation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Accurate representation of videos as part of machine learning by a service provide system provide a basis for a wide range of functionality, e.g., video retrieval, video searching, video recommendations, and so forth. For example, in a content-based video retrieval system, a list of videos is searched by locating representations that are most similar to a representation of a queried video. Accordingly, accurate video representation is a necessary part in accurately identifying similar videos during retrieval. Additionally, compact configuration of the representation is beneficial as further described below through increased storage efficiency, search and ranking computational efficiency, and so forth, especially in large-scale scenarios, e.g., online video storage and streaming services.

Techniques and systems to generate compact video feature representations are described in the following that have a fixed length for respective videos, regardless of a number of frames included in the videos. Thus, even though the videos may have different numbers of frames, the video feature representations have a fixed length that matches, one to another. As such, the video feature representations of different videos may be readily compared by a service provider system to determine similarity of respective videos, one to another, in a computationally efficient manner, such as through Euclidean or cosine distance, which is not possible using conventional techniques. Further, these video feature representations support increased storage efficiency, search and ranking computational efficiency, and so forth which are increasingly beneficial in large-scale scenarios.

A video feature representation is formed for a video using machine learning based on temporal order dynamics exhibited by the video. Temporal order dynamics describe how values of features change over time, e.g., in a sequence of frames of a video. A feature is a visual concept exhibited by frames of a video. Features may be directly observable (e.g., intensity of pixels) or latent and therefore not directly observable, although an effect of the feature may be observed using machine learning. Thus, temporal order dynamics describe how values of these features change in the video and thus may be used to compare videos, one to another, based on similar temporal order dynamics.

In one example, a service provider system learns the temporal order dynamics of a video through machine learning. Temporal order dynamics are expressed in this example as a maximum value of a feature that is reached in frames of a video and a timestamp indicative of a point-in-time in the video at which the maximum value is reached. For example, the maximum value for a feature "intensity" may be stored along with a frame number, output time, and so forth in a video at which that maximum value is reached. This process is repeated for each feature under consideration. Together, the maximum values and timestamps express temporal order dynamics of the video that form the video feature representation.

As such, the video feature representation has a fixed length that is based on a number of features being described in the video through machine learning that is independent of a number of frames in the video. This is contrasted with conventional techniques that rely on frame-level description of individual images within a video. Thus, these conventional techniques ignore temporal dynamics of a video and result in representations having a length based on a number of frames in a respective video which may further complicate comparison, one to another, as previously described above. Further discussion of these and other examples is described in the following sections and shown in corresponding figures.

Example Term Definitions

"Video" in the following is digital content having a plurality of frames that may be processed by a computing device. The plurality of frames, for instance, may include digital images and/or digital audio.

A "feature" is a visual concept exhibited by frames of a video. Features may be directly observable (e.g., intensity of pixels) or latent and therefore not directly observable, although an effect of the feature may be observed using machine learning.

"Temporal order dynamics" describe how values of features change over time, e.g., in a sequence of frames of a video. In one example, temporal order dynamics are expressed as a maximum value of a feature that is reached in frames of a video and a timestamp indicative of a point-in-time at which the maximum value is reached.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
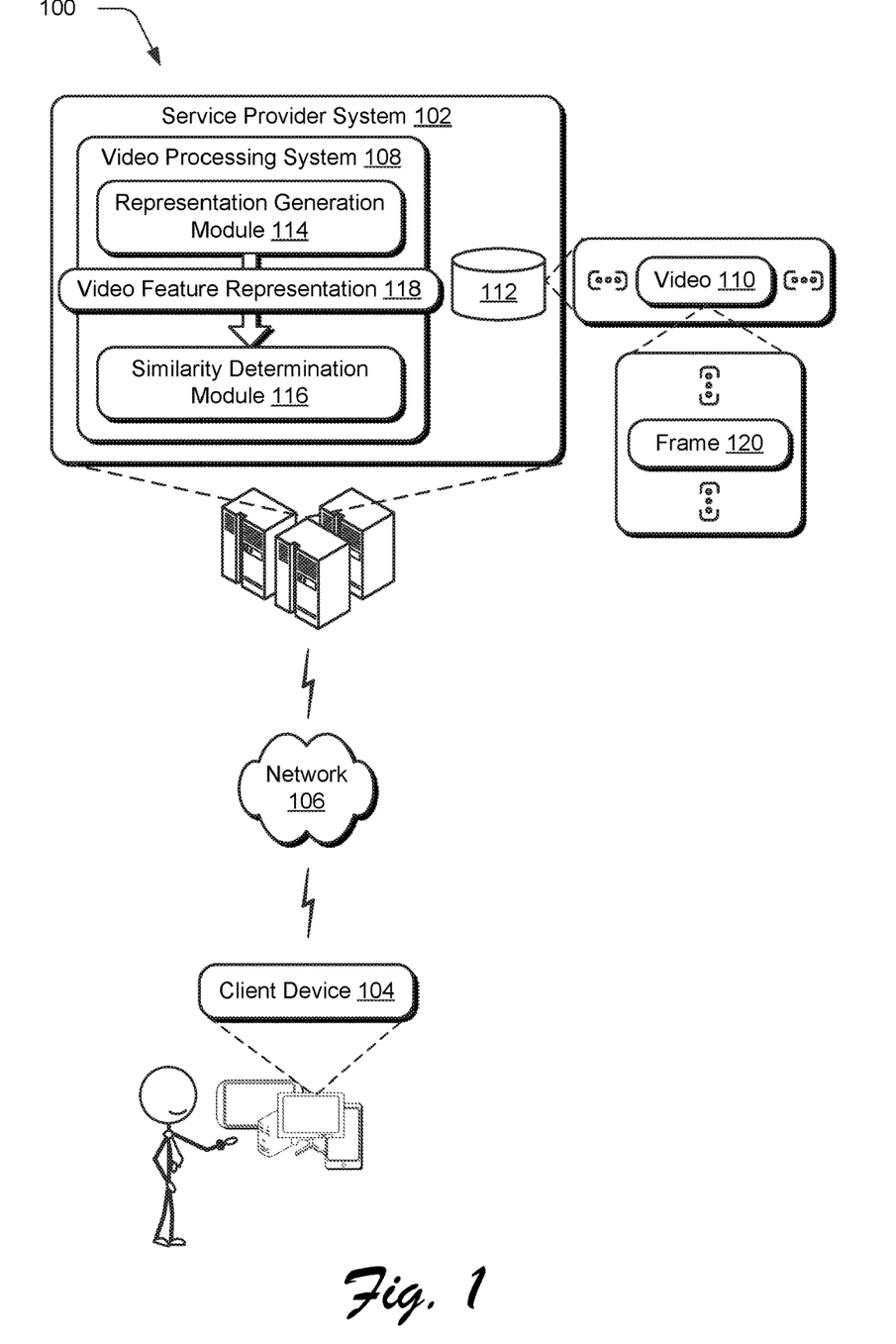
FIG. 1 is an illustration of a digital medium environment in an example implementation that is operable to employ video feature representation techniques described herein.

FIG. 1 is an illustration of a digital medium environment 100 in an example implementation that is operable to employ video feature representation techniques described herein. The illustrated environment 100 includes a service provider system 102 and a client device 104 that are communicatively coupled via a network 106. The service provider system 102 and the client device 104 may be implemented by computing devices that are configurable in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as shown for the service provider system 102 and as described in greater detail in relation to FIG. 6.

The service provider system 102 is illustrated as including a video processing system 108. The video processing system 108 is implemented at least partially in hardware of a computing device to process and transform video 110, which is illustrated as maintained in storage 112 of a computing device. Such processing includes creation of the video 110, modification of the video 110, and rendering of the video 110 in a user interface for output, e.g., by a display device.

Examples of functionality incorporated by the video processing system 108 to process the video 110 is illustrated as a representation generation module 114 and a similarity determination module 116. The representation generation module 114 is representative of functionality implemented at least partially in hardware of a computing device to generate a video feature representation 118. The video feature representation 118 is configured to represent features of the video 110 (e.g., within frames 120 of the video 110) that are usable to compare the video 110 with other videos.

The video feature representation 118, for instance, may be employed by a similarity determination module 116 to generate recommendations, perform searches, and so forth.

A user, for instance, may interact with the client device 104 as illustrated to initiate a search for a video 110 of the service provider system 102 that is similar to other videos maintained by the service provider system 102. In another example, a determination of similarity by the similarity determination module 116 is configured to suggest other videos for purchase by the user, used as a basis to serve targeted advertising, and so forth. Thus, accuracy of the video feature representation 118 also supports the accuracy of techniques that rely on the representation.

As previously described, conventional techniques to represent videos and determine similarity of the videos, one to another, rely on frame level representation learning that are based on individual images formed by the frames. As such, these conventional techniques typically include redundant information that may complicate an accurate determination of similarity of videos to each other as this redundant information has limited usefulness in a similarity determination. Further, these conventional techniques ignore internal temporal dynamics of a video, which may support increased accuracy in representation of the video and a determination of similarity.

In the techniques described herein, for instance, an input video 110 may be received of an athlete performing a bench press. By forming a video feature representation 118 that describes temporal order information, the video feature representation 118 may be used to differentiate between different types of actions having similar spatial features. For example, the video including the bench press may be readily distinguished from videos having lunges based on identification that lunges also involve walking. In this way, temporal dynamic information may be captured as part of the video feature representation 118 which is not possible using conventional techniques as further described in the following.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
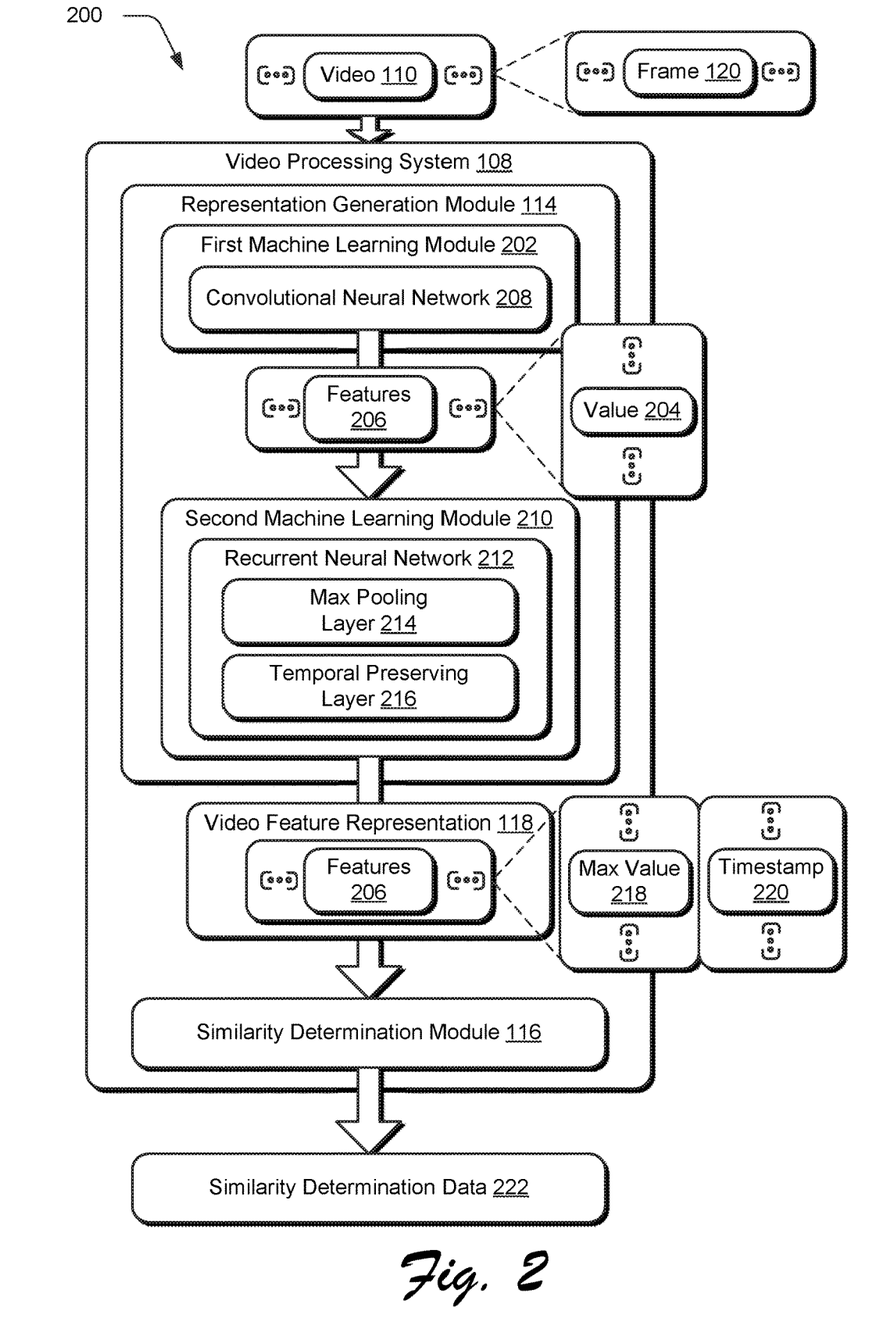
FIG. 2 depicts a system in an example implementation showing operation of a representation generation module of FIG. 1 in greater detail.

FIG. 2 depicts a system 200 in an example implementation showing operation of the representation generation module 114 of FIG. 1 in greater detail. To begin, the video processing system 108 receives a video 110 having a plurality of frames 120. This video 110 is to be used as a basis to determine similarity with other videos in this example based on a video feature representation 118.

The representation generation module 114 employs a first machine learning module 202 to generate values 204 for features 206 of the frames 120 of the video. The first machine learning module 202, for instance, may be configured to implement a convolutional neural network (CNN) 208 using at least one computing device. The convolution neural network 208 is configured to learn values 204 of features 206 (e.g., observable or latent) that may be used to classify the frames 120 of the video 110. Examples of values 204 of observable features include visual concepts such as intensity values per pixel, sets of edges, and so forth. Values of latent features are not directly observable but are also usable to uniquely identify particular visual concepts and values of those visual concepts in respective frames 120 of the video 110. For latent features, for instance, the causation of the value may not be directly observable but the value for that feature may be observed.

The values 204 of the features 206 are then received as an input by a second machine learning module 210. The second machine learning module 210 is configured to generated the video feature representation 118 based on this input. In this example, the second machine learning module 210 is configured to implement a recurrent neural network 212 (RNN). A recurrent neural network 212 is a class of artificial neural network where connections between neurons form a directed cycle. This creates an internal state that may be used to model dynamic temporal behavior. Unlike feed forward neural network (e.g., the convolutional neural network above), recurrent neural networks are configured to process an arbitrary sequence of inputs, which in this example is the values 204 of the features 206 for the frames 120 of the video 110. Through use of the recurrent neural network 212 in this example, dynamic temporal behavior of the values 204 within respective frames 120 is used to generate the video feature representation 118.

In the illustrated example, the recurrent neural network 212 of the second machine learning module 210 includes a max pooling layer 214 and a temporal preserving layer 216. The max pooling layer 214 is configured to determine a maximum value 218 for inclusion as part of the video feature representation 118. The maximum value 218 is determined for each feature 206 of the plurality of features that has been reached for the plurality of frames 120 in the video 110. The temporal preserving layer 216 is configured to maintain a timestamp 220, for inclusion as part of the video feature representation 118, as indicative of when the maximum value 218 is reached for each respective feature of the plurality of features 206 in the video 110.

The video feature representation 118 is then employed by the similarity determination module 116 to generate similarity determination data 222 as a basis to form recommendations, perform searches, and so forth. A user, for instance, may interact with the client device 104 as illustrated in FIG. 1 to initiate a search for a video 110 of the service provider system 102 that is similar to other videos maintained by the service provider system 102 based on the similarity determination data 222. In other example, the similarity determination data 222 is leveraged to suggest other videos for purchase by the user, used as a basis to serve targeted advertising, and so forth. Thus, as previously described accuracy of similarity determination and other functionality that is reliant on the similarity determination depends on accuracy of the video feature representation 118 in representing visual concepts of the video 110.

Figure 3:
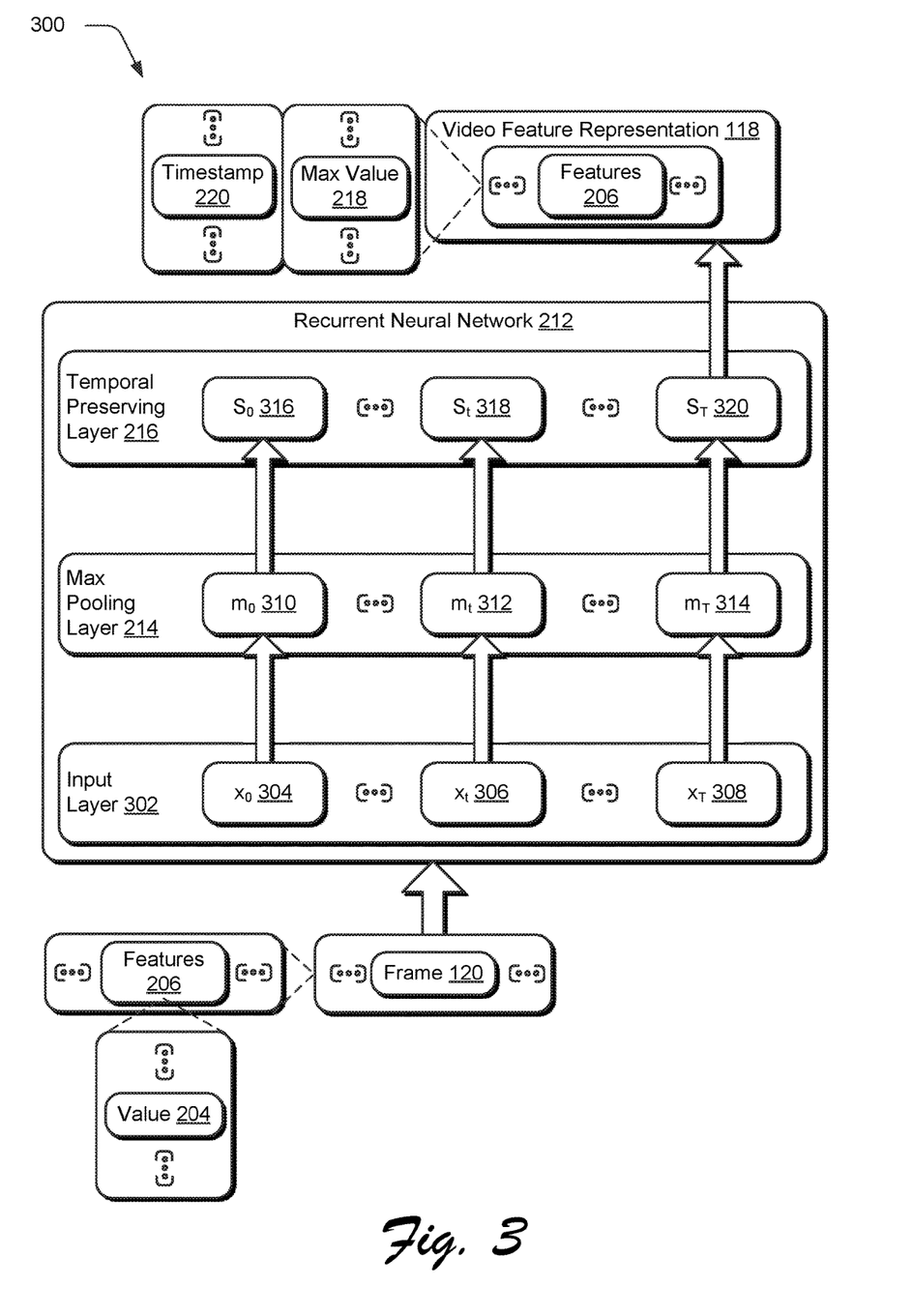
FIG. 3 depicts a system in an example implementation showing operation of a recurrent neural network of FIG. 2 in greater detail.

FIG. 3 depicts a system 300 in an example implementation showing operation of the recurrent neural network 212 of FIG. 2 in greater detail. The recurrent neural network 212 receives as an input values 204 of features 206 for respective frames 120 of the video 110. From these input values 204, the recurrent neural network 212 generates a video feature representation 118 as describing a maximum value 218 reached for each of the features 206 in the video 110 and a timestamp 220 indicating a time at which the maximum value 218 is reached.

To do so, the recurrent neural network 212 employs an input layer 302, a max pooling layer 214, and a temporal preserving layer 216. For discussion purposes, suppose a video 110 "X" is denoted as "X=$x_0, \ldots, x_t, \ldots, x_T$], t∈[0, T]," where "$x_t \in R^n$" is a n-dimensional feature vector to represent the frame at time step "t." To generate the video feature representation 118, all frames 120 "$x_t$" are processed by the recurrent neural network 212 sequentially as illustrated at the input layer 302 as "$x_0$ 304, ..., $x_t$ 306, ..., $x_T$ 308."

The max-pooling layer 214 first projects each of the frames 120 "$x_t$" into a subspace (e.g., a visual concept space) and records the maximum value of each of the features 206 (i.e., the dimensions of the vector) "$m_0$ 304, ..., $m_t$ 306, ..., $m_T$ 308" with "Z" as a projected weight as follows:

$$m_t = \max(M_{t-1}, Zx_t)$$

The temporal preserving layer 216 then calculates a gate value based on a gap "g" between a current frame "$x_t$" and a previous maximal value "$m_{t-1}$." The temporal preserving layer 216 then makes a determination based on the gate value to update "$S_t$" to record a current timestamp (e.g., time step) for a maximum response moment, i.e., a point in time at which the max value 218 for a feature 206 has been reached. After each of the frames 120 "$x_t$" have been processed, the recurrent neural network 212 returns the maximum values 218 and corresponding timestamps 220 which serves as the video feature representation 118, in which "W," "U" are linear weights in the following:

$$g = \text{sigmoi}(Wm_{t-1} - Ux_t)$$

$$S_t = (1-g)*S_{t-1} + g*t$$

Intuitively, the output of the recurrent neural network 212 is a result of occurrences of some visual concepts at a final time step through processing of values 204 of frames 120 of the video 110. The recurrent neural network 212 first projects the values 204 of the frames 120 into subspaces which can be regarded as a visual concept space, and "$m_t$" indicates a likelihood of an occurrence of those visual concepts (i.e., features 206) at time "t." The recurrent neural network 212 then updates the timestamp "$S_t$" in an ongoing fashion as different maximums are reached, if any. Thus, the output "$S_t$" contains all time step order information of those visual concepts.

Figure 4:
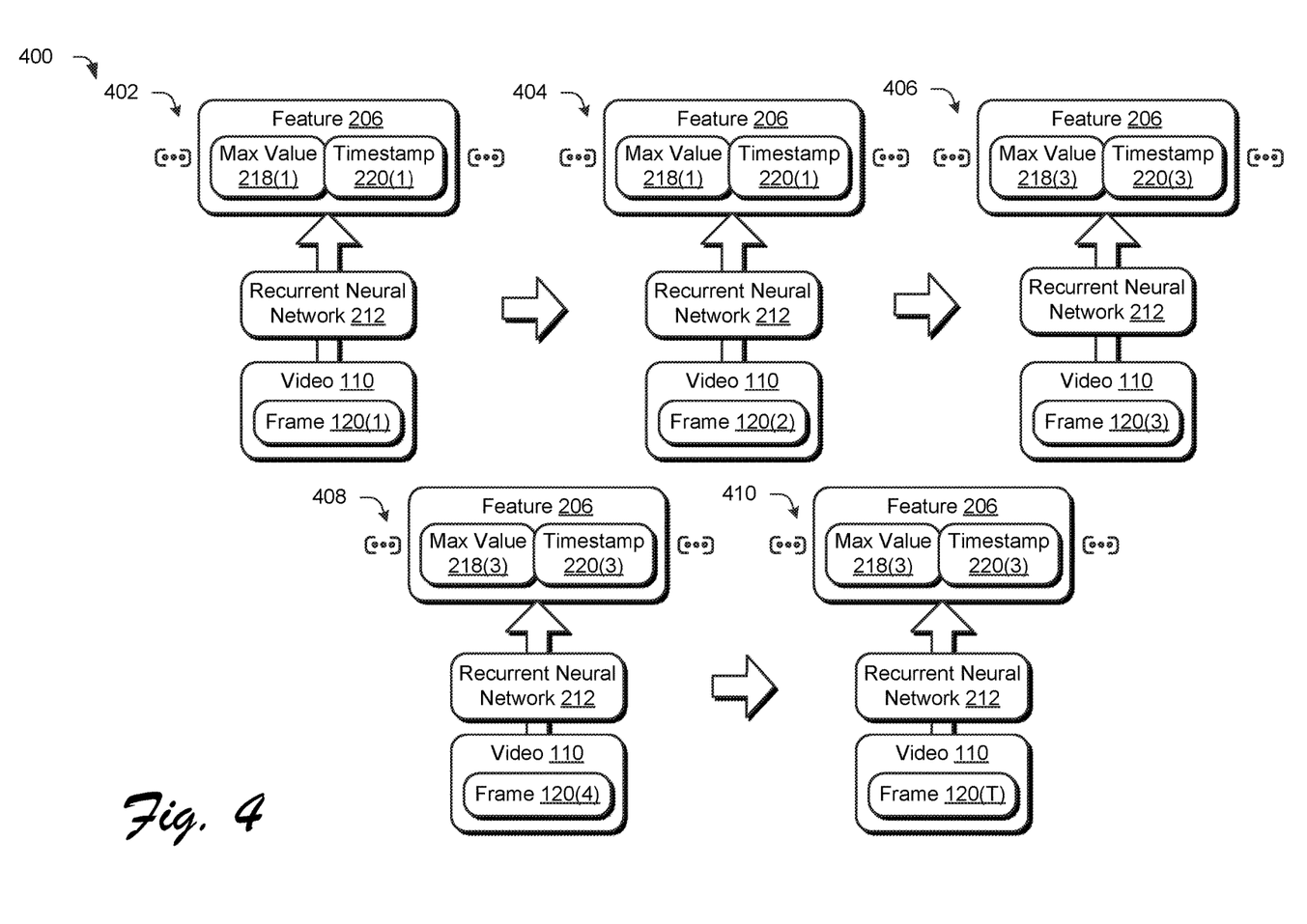
FIG. 4 depicts an example implementation of processing performed by a recurrent neural network of FIG. 3 to generate a maximum value and a timestamp for each respective feature of a plurality of features to generate the video feature representation.

FIG. 4 depicts an example implementation 400 of processing performed by the recurrent neural network 212 of FIG. 3 to generate a maximum value and a timestamp for each respective feature of a plurality of features to generate the video feature representation. This implementation is illustrated using first, second, third, fourth, and fifth stages 402, 404, 406, 408, 410 which correspond to time steps in the processing previously described based on corresponding frames 120 of the video 110.

At the first stage 402, values of features 206 of a first frame 120(1) of the video 110 are processed by the recurrent neural network 212, and a maximum value 218(1) and a time stamp 220(1) are recorded as initial values. At the second stage 404, values of features 206 of a second frame 102(2) of the video 110 are also processed by the recurrent neural network 212. However, the values for the feature 206 are not greater than the maximum value 218(1) recorded from the first frame 120(1) and thus these values remain "as is" as maintained by the recurrent neural network 212.

At the third stage 406, a third frame 120(3) of the video 110 is processed by the recurrent neural network 212. The value for the feature 206 at the third frame 120(3) is greater than the maximum value 218(1) that is maintained in memory and thus is updated as the maximum value 218(3). A timestamp 220(3) is also updated to indicate when this maximum value 218(3) was reached in the video 110. At the fourth stage 408, a value of the feature 206 for a fourth frame 102(4) of the video 110 is processed by the recurrent neural network 212. However, the value for the feature 206 at this point-in-time is not greater than the maximum value 218(3) recorded from the third frame 120(3) and thus these values remain "as is" as maintained by the recurrent neural network 212. This process continues until the last time step, i.e., the last frame 120(T) of the video 110, is processed. Thus, the maximum value maintained by the recurrent neural network 212 describes a maximum value reached for a respective feature 206 in the plurality of frames 120 and a time at which that value is reached through use of the timestamp 220. In an implementation, the maximum value describes a relative magnitude of a difference between the values for respective features for respective frames and not an actual amount of the value reached, although an actual amount is also contemplated.

As shown in FIG. 2 the recurrent neural network 212 may be directly connected to an output of the convolutional layers of a convolutional neural network. Thus, the recurrent neural network 212 may be seamlessly integrated into a joint CNN-RNN framework and trained in an end-to-end fashion. Additionally, since the generated features encode temporal order information, these features may be fused with spatial-based features to further define the video feature representation 118.

The structure of the recurrent neural network 212 has several advantages over conventional techniques. This structure leverages not only a spatial feature vector, but also a time step and as such can encode stronger temporal order information over conventional structures. This structure is also simpler, in that conventional structures employ four different weights while this technique employs three. Further, this structure generates an output at the last time step, solely, while conventional models generate an output at each time step. In this way, the video feature representation 118 has a fixed length and thus supports efficient processing as previously described.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
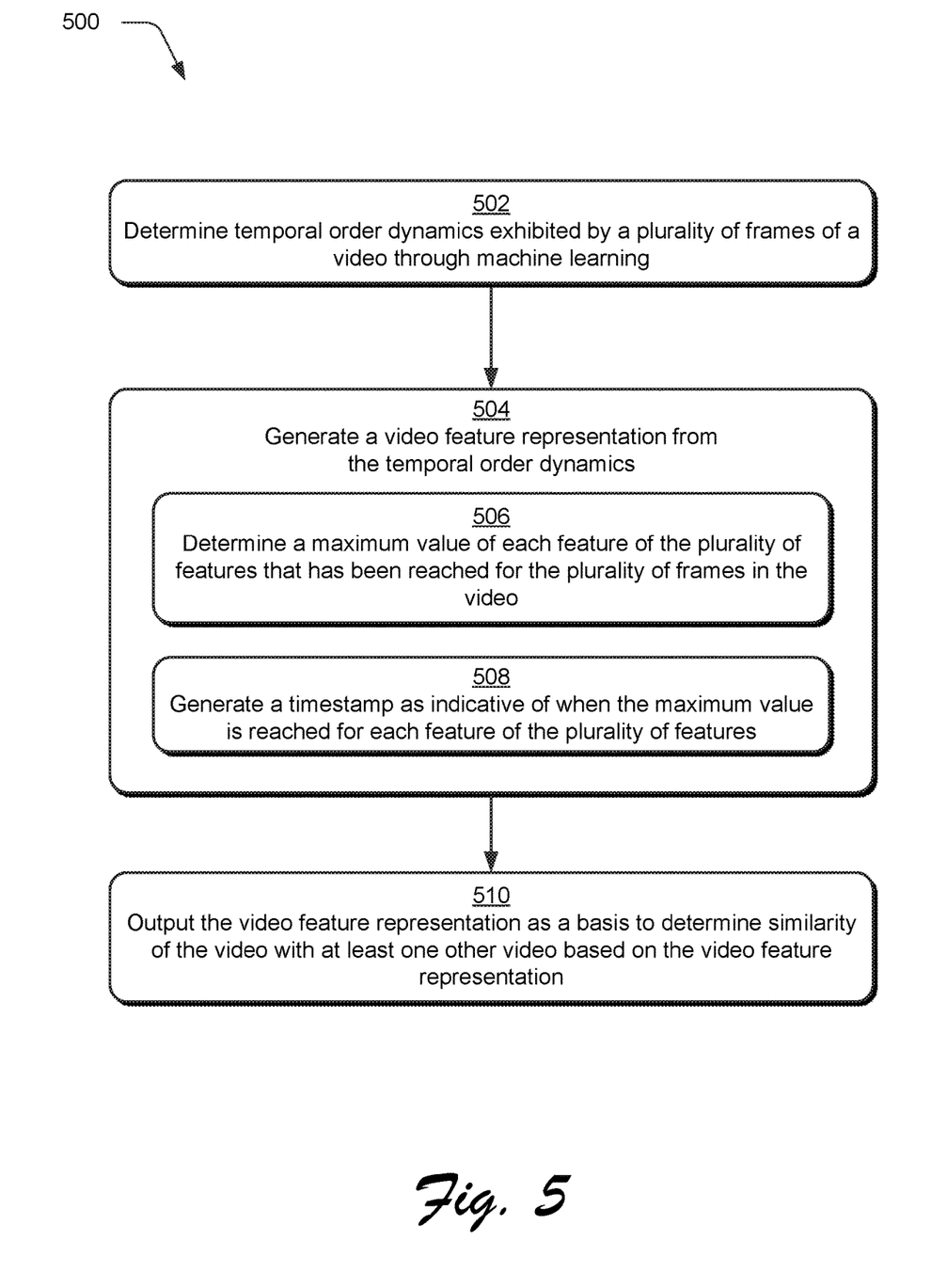
FIG. 5 is a flow diagram depicting a procedure in an example implementation in which a video feature representation is generated using machine learning.

FIG. 5 depicts a procedure 500 in an example implementation in which a video feature representation is generated for a video that is usable as a basis to determine similarity of the video with one or more other videos. Temporal order dynamics are determined that are exhibited by a plurality of frames of a video through machine learning (block 502), e.g., through use of a convolutional neural network. For example, values of features are extracted from each frame of a plurality of frames of a video using machine learning. A representation generation module 114, for instance, may employ a convolutional neural network 206 to extract values 204 of features 206, which are visual concepts exhibited by respective frames 120 of the video 110 which may be observed or latent.

A video feature representation is generated of temporal order dynamics of the video (block 504). Continuing with the previous example a recurrent neural network 212 may then be employed to process the values 204 of the features 206 to describe how those values 204 change in time over a sequence of the frames 120 in the video 110. For example, a maximum value is determined of each feature of the plurality of features that has been reached for the plurality of frames in the video (block 506). A timestamp is also generated as indicative of when the maximum value is reached for each feature of the plurality of features (block 508). In this way, the video feature representation 118 is generated to have a fixed length that is independent of a number of the plurality of frames 120 in the video 110.

The video feature representation is then output as a basis to determine similarity of the video with at least one other video based on the video feature representation (block 510). A similarity determination module 116, for instance, may compare the video feature representation 118 of the video 110 with video feature representations of other videos to determine similarity, such as to make a recommendation, perform a search, or other functionality that may be implemented by a computing device based on this determination.

Example System and Device

Figure 6:
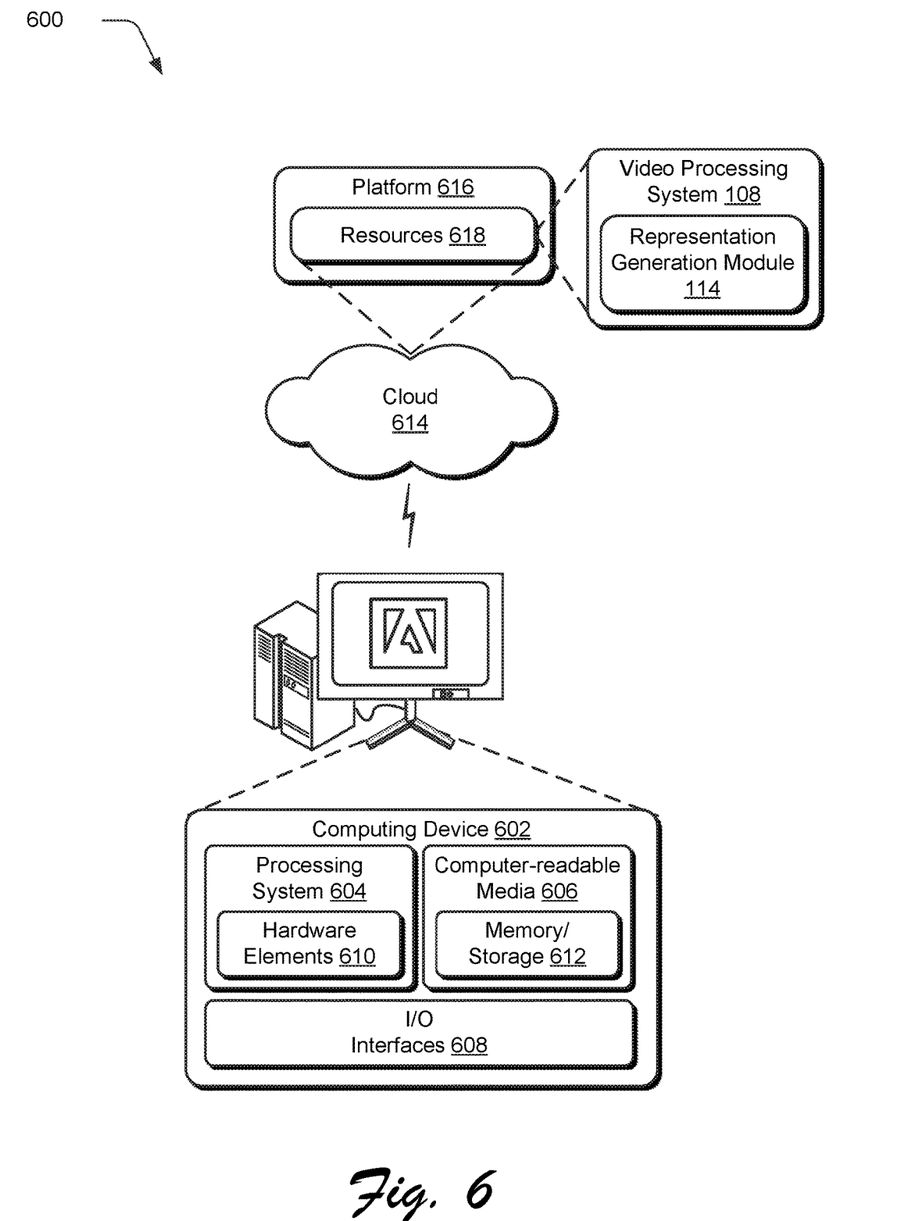
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the video processing system and representation generation module 114. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to learn a compact feature representation of video, a method implemented by at least one computing device, the method comprising:
   determining, by the at least one computing device, temporal order dynamics exhibited by a plurality of frames of the video through machine learning, the temporal order dynamics describing changes to the plurality of frames, one to another, over time;
   generating, by the at least one computing device, a video feature representation from the temporal order dynamics, the generating based on:
      a value of each feature of a plurality of features that has been reached for the plurality of frames in the video from the machine learning; and
      a timestamp indicating when the value is reached for each feature of the plurality of features; and
   outputting, by the at least one computing device, the video feature representation as a basis to determine similarity of the video with at least one other video.

2. The method as described in claim 1, wherein the value describes a relative magnitude of a difference between values for respective features for respective frames of said plurality of frames.

3. The method as described in claim 1, wherein the determining the temporal order dynamics is performed using the machine learning as part of a convolutional neural network.

4. The method as described in claim 3, wherein the convolutional neural network learns changes to latent features of each frame of the plurality of frames to describe the temporal order dynamics.

5. The method as described in claim 1, wherein the generating is performed using machine learning as part of a recurrent neural network.

6. The method as described in claim 1, wherein the generating of the video feature representation is based at least in part on changes to values of features learned using machine learning.

7. The method as described in claim 1, further comprising determining the similarity of the video with the at least one other video based on the video feature representation of the video and a video feature representation of the at least one other video.

8. The method as described in claim 7, wherein the determining of the similarity is based on a Euclidean or cosine distance between the video feature representation of the video and the video feature representation of the at least one other video.

9. In a digital medium environment to learn a compact feature representation of video, a system comprising:

a first machine learning module implemented at least partially in hardware of at least one computing device to extract values of features from each frame of a plurality of frames of a video; and a second machine learning module implemented at least partially in hardware of at least one computing device to generate a video feature representation of temporal order dynamics of the video, the second machine learning module including:

a max-pooling layer to determine a maximum value, for inclusion as part of the video feature representation, of each feature of the features for the plurality of frames in the video; and a temporal preserving layer to generate a timestamp, for inclusion as part of the video feature representation, indicating when the maximum value is reached for each feature of the plurality of features in the video.

10. The system as described in claim 9, wherein the maximum value describes a relative magnitude of a difference between values for respective features for respective frames of said plurality of frames.

11. The system as described in claim 9, wherein the first machine learning module implements a convolutional neural network.

12. The system as described in claim 11, wherein the features are latent features.

13. The system as described in claim 9, wherein the second machine learning module implements a recurrent neural network.

14. The system as described in claim 9, further comprising a similarity determination module implemented at least partially in hardware of the at least one computing device to determine a similarity of the video with at least one other video based on the video feature representation of the video and a video feature representation of the at least one other video.

15. The system as described in claim 14, wherein the similarity is based on a Euclidean or cosine distance between the video feature representation of the video and the video feature representation of the at least one other video.

16. In a digital medium environment to learn a compact feature representation of video, a system comprising:

means for determining temporal order dynamics exhibited by a plurality of frames of the video through machine learning, the temporal order dynamics described using:

a value of each feature of a plurality of features for the plurality of frames in the video learned through the machine learning; and a timestamp indicating when the value is reached for each feature of the plurality of features in the video;

means for generating a video feature representation from the temporal order dynamics; and means for outputting the video feature representation as a basis to determine similarity of the video with at least one other video.

17. The system as described in claim 16, further comprising means for determining the similarity of the video with the at least one other video based on the video feature representation of the video and a video feature representation of the at least one other video.

18. The system as described in claim 17, wherein the determining similarity means is configured to determine the similarity based on a Euclidean or cosine distance between the video feature representation of the video and the video feature representation of the at least one other video.

19. The system as described in claim 16, wherein the value describes a relative magnitude of a difference between values for respective features for respective frames of said plurality of frames.

* * * * *